No. 877,513.
PATENTED JAN. 28, 1908.
E. C. METZ.
DEVICE FOR HEATING CRUCIBLES AND HOT WATER.
APPLICATION FILED MAY 11, 1907.
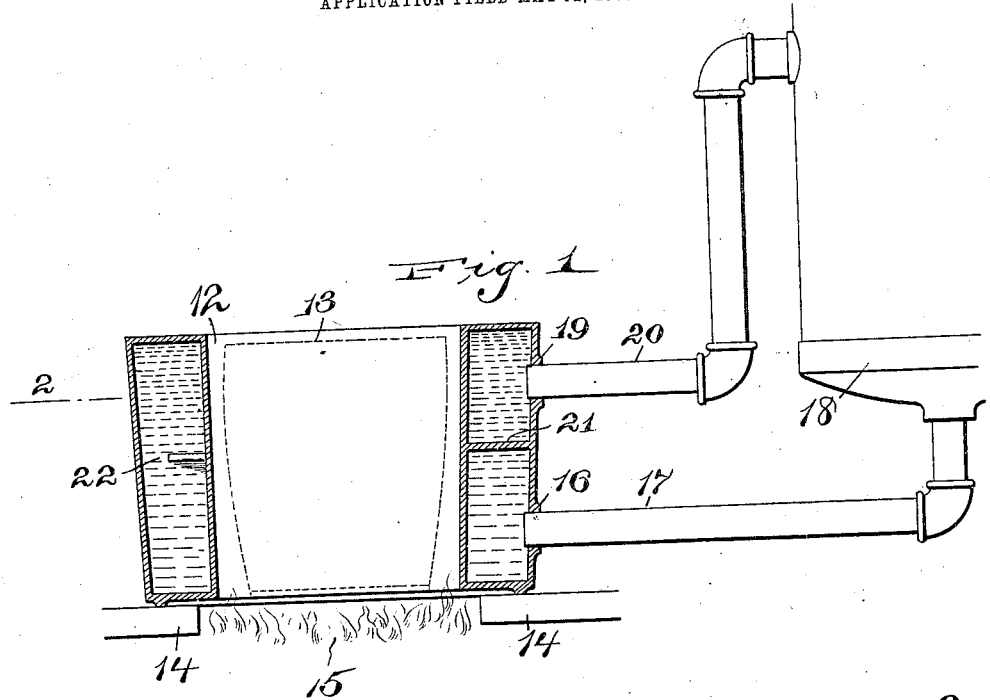
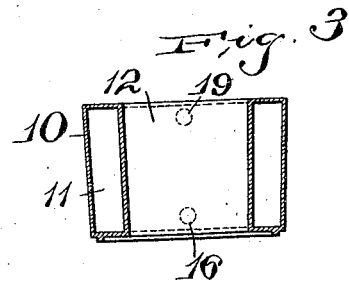
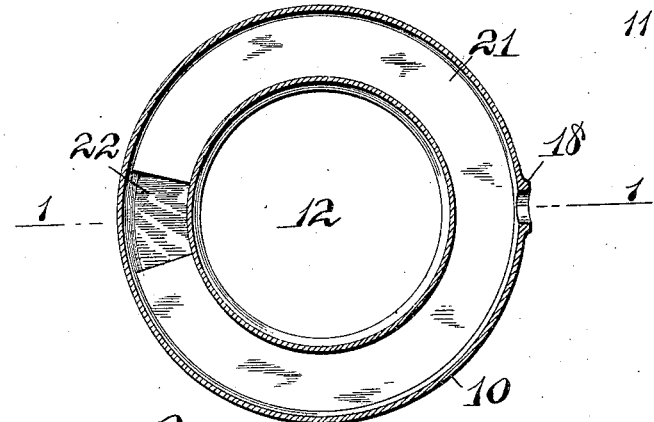
WITNESSES:
S. A. Rogers
E. A. Pell
INVENTOR
Edgar C. Metz,
BY
Wm H Caufield
ATTORNEY

UNITED STATES PATENT OFFICE.

EDGAR C. METZ, OF NEWARK, NEW JERSEY, ASSIGNOR TO JOHN KEHOE AND EDGAR C. METZ, OF NEWARK, NEW JERSEY.

DEVICE FOR HEATING CRUCIBLES AND HOT WATER.

No. 877,513.   Specification of Letters Patent.   Patented Jan. 28, 1908.

Application filed May 11, 1907. Serial No. 373,159.

*To all whom it may concern:*

Be it known that I, EDGAR C. METZ, a citizen of the United States, residing at Newark, in the county of Essex and State of New Jersey, have invented certain new and useful Improvements in Devices for Heating Crucibles and Hot Water; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a device that is adapted for holding a crucible, and is particularly designed for holding crucibles in which jewelers melt their precious metals, and the holder in which the crucible is heated is designed to be made hollow to provide a circulation for water contained therein, and pipe connections are installed to connect the heater with a boiler or similar element holding hot water, thus insuring a circulation and supplying hot water to the plant.

In small shops it is usual now to install electric motors for the operation of machinery, and to have steam heat to heat the place, and jewelers and other similar manufacturing concerns are at a loss for hot water unless a special apparatus is installed therefor.

This device is designed to provide a holder for crucibles, which are now made of fire clay or plumbago, and to make it to hold water so that when the crucible is heated and the gold is melted, hot water is supplied to the shop by means of the boiler to which the heater is connected.

The invention is illustrated in the accompanying drawing, in which

Figure 1 is a vertical section of a heater and crucible holder, taken on line 1, 1, in Fig. 2. Fig. 2 is a section on line 2, in Fig. 1, and Fig. 3 is a section of a modified form of heater.

The heater itself is made of any suitable shape, but preferably circular or annular, and is formed of the casing 10 which provides a water chamber 11, and also has the central perforation 12 which is designed to receive, in the usual way with crucible holders, a crucible 13 in which the melting is done. The crucible sets on a suitable furnace 14 and is supplied with heat from a flame 15, this being usually supplied by means of gas and an air blast in devices of this kind, and in this way about 600 degrees of heat is maintained. On one side, and projecting through the outer wall by means of the perforation 16, is a pipe 17 leading to a suitable receptacle 18 to contain the hot water, and the screw-threaded perforation 19 provides for feeding the boiler from the heater, by the pipe 20.

It will thus be seen that when the gold is being melted, the water in the surrounding casing is heated, and through the pipe connections a constant supply of hot water is maintained.

If desired, a diaphragm 21 is placed to extend nearly around the heater inside the chamber 11, a perforation or perforations 22, however, being supplied in the diaphragm, this perforation 22 being preferably on the side opposite the pipe connections so that a circulation and a thorough heating of the same is assured. Thus water coming from the boiler and passing through the pipe 17 is compelled to pass around through the chamber 11 to the other side of the holder, where it passes up through the opening 22 and then passes again around on both sides of the chamber and through the pipe 20.

A saving of gas is caused by this device, and a very useful and efficient heater is the result.

Having thus described my invention, what I claim is:—

A holder for crucibles comprising a body-portion adapted to receive a crucible and being of approximately similar shape on the inside, the crucible holder being hollow to form a water chamber, an annular diaphragm in the holder with an opening therein, in combination with a boiler and a pair of pipes leading therefrom to the holder, the pipes leading into the holder on opposite sides of the diaphragm and on the side of the chamber opposite the opening in the diaphragm, whereby the water is caused to pass around on both sides of the hollow portion of the holder on its way to the opening, and also on its return.

In testimony, that I claim the foregoing, I have hereunto set my hand this 4th day of April, 1907.

EDGAR C. METZ.

Witnesses:
 WM. H. CAMFIELD,
 E. A. PELL.